United States Patent [19]
Lovitt

[11] 3,978,819
[45] Sept. 7, 1976

[54] CAGE AND ACCESSORIES THEREFOR

[76] Inventor: Robert O. Lovitt, 1609 Terbit, Fort Worth, Tex. 76112

[22] Filed: Nov. 25, 1974

[21] Appl. No.: 526,785

[52] U.S. Cl. .................................. 119/22; 119/17; 119/18
[51] Int. Cl.² ......................................... A01K 31/04
[58] Field of Search .................. 119/15, 18, 22, 17, 119/72.5

[56] References Cited
UNITED STATES PATENTS

| | | | |
|---|---|---|---|
| 1,807,932 | 6/1931 | Rainwater | 119/22 |
| 1,973,952 | 9/1934 | Golberg | 119/18 X |
| 3,109,413 | 11/1963 | Patchett | 119/17 X |
| 3,320,929 | 5/1967 | Kay | 119/18 |
| 3,529,575 | 9/1970 | Schalk | 119/72.5 |
| 3,830,200 | 8/1974 | Patterson | 119/17 X |

Primary Examiner—J.N. Eskovitz
Attorney, Agent, or Firm—Wofford, Felsman, Fails & Zobel

[57] ABSTRACT

An improved cage for rodents or the like that facilitates maintenance and care and is adapted for use in a battery, characterized by perforate floors, a plurality of spaced apart apertures in one of the accessible upstanding walls and a water bottle that has supports adapted to fit the spaced apart apertures, has a vacuum sealing lid that can be readily lifted from or snapped into place to allow quick refilling and provide the water only on demand to the interior of the cage. The battery of cages has a belt that traverses both beneath one tier of cages and above the next lower tier for protection of occupants of the lower tier from wastes. The belt is washed and disinfected and has a unique construction. Also disclosed are additional embodiments and details of construction forming a preferred embodiment of this invention.

13 Claims, 14 Drawing Figures

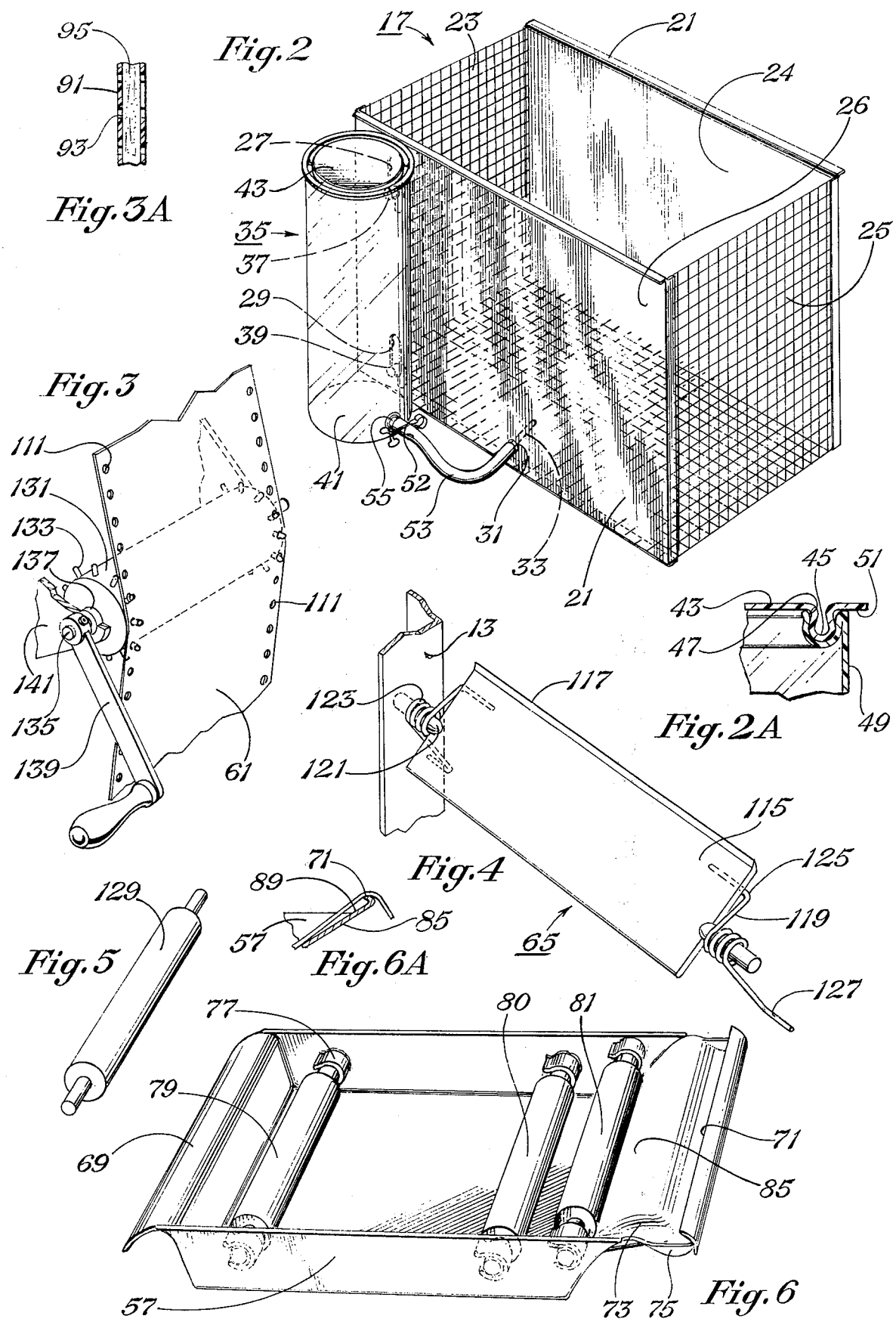

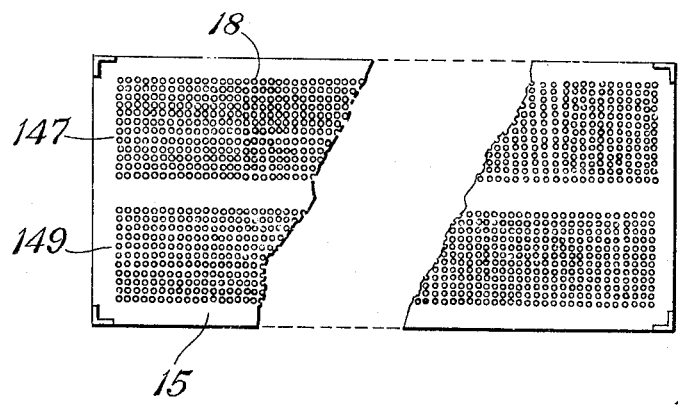
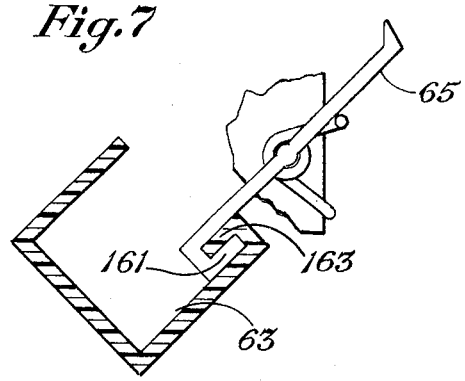
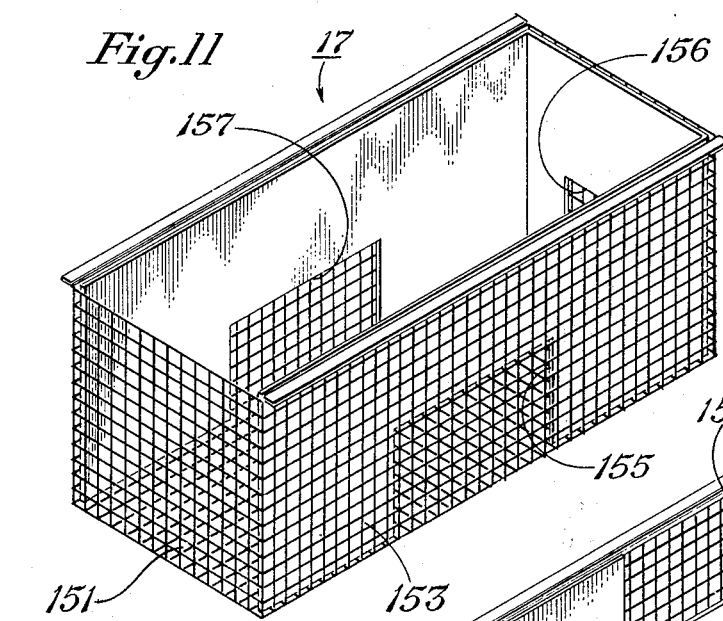
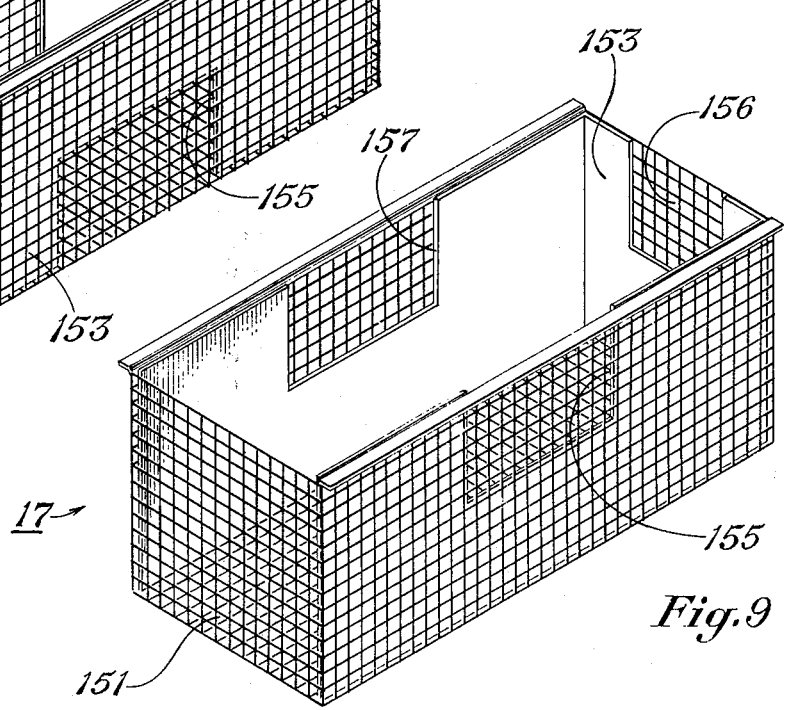

CAGE AND ACCESSORIES THEREFOR

BACKGROUND OF THE INVENTION

1. Field of the Invention

This invention relates to the care and maintenance of animals, such as rodents, for research purposes; and, more particularly, to cages and accessories facilitating the daily care of the animals.

2. Description of the Prior Art

It is important in research that animals being treated be maintained in a sanitary condition, since the results of the research often depend upon the prevention of the spread of disease among the animals. Such illness or death of the animals from extraneous causes could nullify a research project.

Cages for experimental animals, such as rodents, have been made partially of metal heretofore. The rodents frequently gnaw on the exposed portions on their cages or drinking nozzles, and with such cages cause ingestion of metal or the oxides of the metal to interfere with results of the tests, particularly in nutritional experiments. It is also important that the cages be constructed to allow proper ventilation.

A wide variety of different types of apparatus have been proposed including pans beneath the cages with rotary scrapers, permeable bottom cages with adsorbent paper that can be periodically pulled forward and disposed of, droppings on a belt having a rewind cable, egg collecting belts, perforate bottoms, experimental cages with electrical connectors for monitoring movement and cages with laterally movable "catch sheets" of polyethylene or the like. Automated water delivery systems have been proposed in which conduits having troughs that are float operated or otherwise operated, dispense water to the rodents or occupants of the cages. The expense of employing the special sheets of material or the risk of waste feeding through the material onto occupants of cages therebelow have prevented the completely satisfactory solution to the problem. Moreover, the systems that dispense at the whim of the operator were subject to a number of disadvantages, since it is desirable that drinking water and the like be dispensed on demand of the occupant within the cage, without running onto lower cages.

Thus, despite the wide variety of approaches tried in the prior art, no completely satisfactory approach has yet been found in allowing economically feasible collection of waste and readily refillable water containers.

SUMMARY OF THE INVENTION

Accordingly, it is an object of this invention to provide improved cage and accessories that obviate the disadvantages of the prior art and facilitate care and maintenance of the occupants of the cages.

More particularly, it is an object of this invention to provide an improved rack and water bottle accessories that dispense water on demand by the occupant of the cage, that rids the cage of the wastes by the occupant without hazard to other occupants below and that has no expensive special sheets that have to be supplied and allows semi-automated and rapid care of the animals while obviating the disadvantages of the prior art.

These and other objects will become apparent from the descriptive matter hereinafter, particularly when taken in conjunction with the appended drawings.

In accordance with this invention, a plurality of cages are arranged on a supporting structure in a plurality of rows and tiers. An endless belt member traverses forwardly beneath a row of cages in a given tier and backwardly over the tier therebelow. It traverses through a wash pan containing a surfactant solution and through a disinfectant pan containing a solution of disinfectant such that the belt can be moved at least periodically to clean the wastes while disinfecting the belt. A plurality of scrapers are provided for scraping the wastes from the top surface of the belt before it traverses backwardly over the top of the next tier of cages. The wastes drop into a waste catch pan. The belt may be moved manually or by automated means.

In order to facilitate use of the system, each of the cages has perforate sides and floors and has a water bottle in which the top seals vacuum tight from being pressed into position but can be readily snapped off the bottle to facilitate refilling while the flexible conduit and drinking nozzle are held vertical to prevent the water from flowing from the water bottle.

BRIEF DESCRIPTION OF THE DRAWINGS

FIG. 2 is an isometric view of a cage in accordance with another embodiment of this invention.

FIG. 2A is a partial cross sectional view of the top and lid of the water bottle of FIG. 2.

FIG. 3 is a partial isometric view, partly cut away and shown in section, of the belt and belt moving means of FIG. 1.

FIG. 3A is a partial cross sectional view of the belt of FIG. 3.

FIG. 4 is a partial isometric view of the scraper of FIG. 1 for scraping wastes from the belt.

FIG. 5 is an isometric view of the rollers of FIG. 1.

FIG. 6 is an isometric view of the pan employed for the wash pan or the disinfectant pan of FIG. 1.

FIG. 6A is a partial cross sectional view of another embodiment of the pans of FIG. 1.

FIG. 7 is a plan view of perforate level divider facilitating ventilation.

FIG. 8 is an isometric view of a cage with an insert in accordance with another embodiment of this invention.

FIG. 9 is an isometric view of the cage of FIG. 8 with the insert inverted.

FIG. 10 is an isometric view of a water bottle in accordance with still another embodiment of this invention.

FIG. 11 is a partial side view, partly in section, of a scraper and waste pan in accordance with another embodiment of this invention.

DESCRIPTION OF PREFERRED EMBODIMENTS

Figure 1:
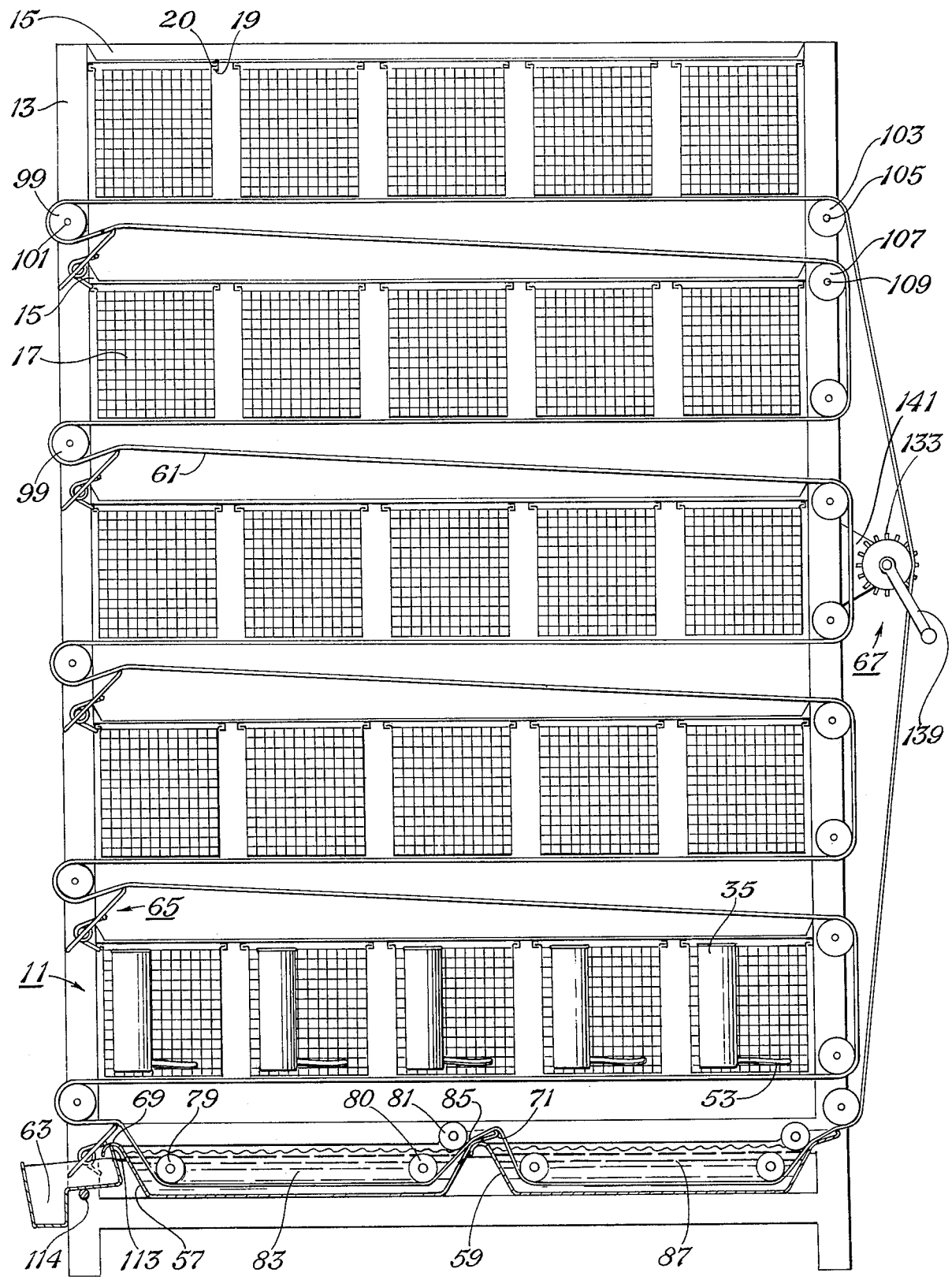
FIG. 1 is an elevational view from the side of a five-tier cage battery constructed according to one embodiment of this invention; with cages therein, front corner posts removed for clarity, and pans sectioned.

Referring to FIG. 1, battery frame 11 is of substantially orthodox construction employing longitudinal and transverse horizontal members, vertical members and suitable bracing member to achieve the desired size and shape. Specifically, the battery frame 11 includes corner posts 13 and suitable lateral end members (not shown). A plurality of level dividers 15 are provided supporting the respective tiers of cages 17. The level dividers 15 may have any appropriate conventional structure. For example, they may comprise a solid sheet; but preferably, have continuous sheet support that is perforate; as by apertures 18, FIG. 7; for facilitating ventilation, and contributing to an antiseptic environment with a disinfected belt traversing both above and below the cages. The level dividers have free molded runners 19 for supporting the flanges 20 on the sides of the cages 17. If desired, the cages can be set on horizontally extending members as long as the members do not block the perforate bottom of the cages or otherwise allow wastes to accumulate thereon. Preferably, the indicated suspended structure is employed to facilitate care of the occupants of the cages. The battery frame 11 may have wheels on each of its corner posts 13 in order to be portable. As illustrated, however, the wheels have been omitted for simplicity.

As illustrated, the battery frame 11 supports five tiers of cages 17, arranged in five single rows of cages. On the other hand, if desired, double rows of cages may be supported on each tier by the battery frame 11.

Each cage 17 has a perforate bottom 21, FIG. 2, such as provided by a wirelike grid structure. In any event, the perforate bottom allows the waste materials, such as droppings, urine and the like to fall through the bottom by gravity. The bottom 21 is connected with four upstanding walls 23–26. If desired, at least two of the upstanding walls, such as ends 23 and 25, may be formed of the same foraminous structure as the bottom 21, whether it be wirelike grid structure, perforate plastic or the like. Similarly, the side 26 may be formed of the same perforate structure, if desired. As illustrated, however, the side 26 is formed of clear plastic and has a pair of apertures 27 and 29 penetrating therethrough at a predetermined distance apart. The side 26 has a third aperture 31 for insertion of the drinking nozzle 33 interiorly of the cage. The respective joints of the cage, as at the corners and bottom of the walls, may be formed by any suitable structure, as by U-shaped channels with the perforated structure inserted therebetween and held in place by suitable means, as is conventionally done. Conventional means include adhesion as by plastic, such as epoxy resin, screws or nuts and bolts. The flanges 20 are integrally formed with the tops of the sides 24 and 26, such that they readily support the weight of the cage 17, water bottle 35 and occupant. Each of the cages 17 has, as indicated, its own water bottle 35 suspended on one of the upstanding walls.

The water bottle 35 has a plurality of supports 37 and 39 that are connected at one end to a container 41 for supporting the container and water therewithin on one upstanding wall of the cage 17. As illustrated, the supports 37 and 38 are L-shaped members in which the base of the L is connected with the container 41, as by being integrally molded therewith. Thus, the downwardly depending portion of the support may be inserted through the apertures 27 and 29 to hold the container 41 in place on one of the upstanding walls. Of course, if the side 26 has the same foraminous structure as the bottom 21, the respective supports 37 and 39 may be inserted through one of the apertures in the grid structure. As illustrated, the supports 37 and 39 are spaced the same vertical distance apart as are the apertures 27 and 29 such that they matingly engage for support of the water bottle 35. The container 41 has its bottom sealingly connected with its walls so as to contain the water.

The water bottle 35 has at its top end a lid 43, FIGS. 2 and 2A, that seals vacuum tight. Specifically, the lid 43 has a downwardly depending rim 45 for sealingly engaging groove 47 that is integrally formed with the side wall 49 of the container 41. To ensure sealing, the groove 47 and the rim 45 are larger in their lateral dimensions than at the top. The lid 43 has an overhang 51, however, to facilitate snapping the lip open for filling the water bottle 35. A flexible conduit 53 connects the drinking nozzle 33 with the container 41. The flexible conduit 53 is connected with a tubular outlet 55 sealingly connected at the bottom of the container 41. An aperture penetrates longitudinally through the outlet 55 and through the wall of the container 41 to allow water to flow to the drinking nozzle 33. The flexible conduit 53 is long enough that the drinking nozzle 33 may be inserted through an aperture in the wall of the cage, such as the third aperture 31, at a position displaced laterally from the water bottle 35. This allows using larger water bottles than the water bottles that have their nozzles beneath them. If desired, a clamp 52 may be stored on the outlet 55 and moved over and employed to close the flexible conduit 53 for filling the container 41. On the other hand, the water bottle 35 can be filled without the clamp by the simple expedient of holding the flexible conduit 53 upright to prevent the water from flowing from the water bottle 35.

The outlet 55, the flexible conduit 53 and the drinking nozzle 33 all have bores of diameters small enough to vacuum lock with the interfacial tension between the water and the air to prevent the water from flowing from the container when the lid 43 is in place. When water is drawn from the nozzle by the occupant of the cage 17, however, the diameter is large enough to allow air to be pulled into the water bottle 35 when the vacuum gets great enough inside. For example, the bores are no larger than 5 millimeters (mm), and are preferably 1–3 mm. Smaller bores have a propensity to become plugged. Larger diameters cause leakage. Thus, the water bottle 35 dispenses water on demand but not otherwise.

Referring again to FIG. 1, the battery combination also includes a wash pan 57; a disinfectant pan 59; a belt member, or belt, 61; a waste catch pan 63; a plurality of scraper means 65 for scraping wastes from the belt and a belt member moving means 67 for moving the belt, at least periodically.

The wash pan 57 contains a surfactant solution for cleaning the belt member 61. The surfactant solution may comprise any of the conventional surfactant solutions, but ordinarily will comprise an aqueous solution of a surfactant. The surfactant may be anionic, cathionic, or nonionic, since the belt does not come into direct contact with any of the animals. Consequently, there is no need for being concerned about carcinogenic surfactants or free radicals. Accordingly, the petroleum sulfates, petroleum sulfonates, or other such highly effective detergents may be employed. An excellent surfactant is a sodium salt of nonylphenylsulfonate. The wash pan 57, as illustrated in FIG. 6, has a rounded entry end 69. The wash pan 57 has a squegee member 71 for wiping the liquid surfactant solution from the belt member 61. The surfactant solution may be returned to the wash pan 57 by any suitable return means; such as, a weir 73, FIG. 6, or a monotonically inclined surface, or portion, 89, FIG. 6A. Suitable ends 75 are provided to allow a small accumulation of the liquid surfactant solution if the weir 73 is employed.

The wash pan 57 has suitable means, such as C-clamps 77 into which rollers, such as rollers 79–81 can be snapped. The rollers 79 and 80 are merely idler rollers to maintain the belt near the bottom of the wash pan 57 and submerged in the surfactant solution 83, FIG. 1. The roller 81 is placed close enough to the exit end 83 that it presses against the belt member 61 for forcing the liquid from the belt member 61. Thus, the roller 81 is analogous to the wringer rollers of the old washing machines.

The disinfectant pan 59 has the same construction as that described hereinbefore with respect to the wash pan 57 and illustrated in detail in FIG. 6. The disinfectant pan 59 has a solution of disinfectant 87, FIG. 1, however. Any of the conventional disinfectant solutions may be employed for the same reasons as noted hereinbefore with respect to the surfactant solution. Instead of employing the usual highly active disinfectants containing nascent oxygen, like hydrogen peroxide, it is ordinarily advantageous to employ the more stable disinfectants, such as phenol, or Pinesol disinfectants, or other disinfectants that are soluble, or at least dispersible, in water. If desired, the disinfectant solution may include other types of disinfectants, such as the hydrophobic dips, like cresol, or even high concentrations of conventional antiseptics.

With the foregoing types of pans, the squegee 71 may be disposed above the top of the end of the pan such that the liquid that is squeezed from the belt will roll back into the pan without requiring the weir 73. This allows the series stacking of the ends of the pans easily. Such a construction is illustrated in profile in FIG. 6A. As can be seen in FIG. 6A, the exit end 85 has a monotonically inclined portion 89 that has no dips so that the liquid will run back into the pan.

The respective pans may be formed of any material, such as galvanized metal or plastic. Preferably, a thermoplastic material will be employed to obviate difficulties with corrosion. Suitable plastics include polyethylene, polypropylene and the more expensive but more easily worked plastics, such as acrylonitrile butadiene styrene copolymber (ABS).

Suitable stops, such as angle iron cross pieces, may be employed to prevent longitudinal movement of the pans 57 and 59 as the belt member 61 is pulled therethrough; particularly, passage between the roller 81 and exit end 85 by the belt member 61.

The endless belt member 61 comprise an elongate belt that may have ends joined by suitable means, such as the conventional belt staples in each end of the belt with a rod intermediate the overlapping ends of the staples; or merely being sewed together with a suitably strong material, such as Nylon thread. The belt member 61 may comprise a single thickness of material. It is preferable, however, that the belt member comprise perforate surface layers 91, as of a plastic, such a polyethylene, having apertures 93 penetrating therethrough with a layer of absorbent material, such as cotton, wool, sponge, or the like, therebetween. Thus, when liquid wastes are spilled on the top surface of the belt, the absorbent material 95 will absorb the liquid waste and prevent its running through onto the occupants in the cages in the lower tiers.

The belt member 61, having its ends joined together to be endless, traverses forwardly beneath respective tiers to pick up wastes. After the waste is scraped therefrom, the belt member 61 traverses backwardly over the top of the next lower tier to protect occupants of the lower tier from the wastes of the upper tier, even if some should come through the belt beneath the bottom of the upper tier. The belt member 61 traverses through the surfactant solution in the wash pan 57 and through the disinfectant solution 87 in the disinfectant pan 59.

In order to effect the respective forward and backward traversal of the belt, a plurality of first idler rollers 99 are disposed adjacent the scraper means 65 at the respective downstream ends of the tiers beneath the cages 17. The rollers 99 have the ends of their respective shafts 101 jounalled for rotation in suitable means, such as bearings (not shown), in the corner posts 13 or other suitable supports on the battery frame 11. A plurality of second idler rollers 103 are disposed at the respective upstream ends of the respective tiers such that the belt member traversing beneath the second rollers and on top of the first rollers will traverse beneath the cages in that respective tier. The second idler rollers 103 have their shafts 105 journalled for rotation in suitable means, such as bearings (not shown) in the corner posts 13, or other suitable supports on the battery frame 11.

In order to enable traverse of the belt member 61 over the top of the lower tier of cages, a plurality of return idler rollers 107 are disposed at the upstream ends of the tiers. At least a portion of the return idler rollers 107 extend above the cages 17 such that the belt member 61 traversing from beneath the first idler roller 99 to the top of the return idler roller 107 will traverse above the cages 17 for protecting the occupants. The return idler rollers 107 have their shafts 109 journalled for rotation in suitable means, such as bearings (not shown), in the respective corner posts 13, or other suitable supports on the battery frame 11.

Each of the respective rollers may have any conventional shape, such as cylindrical body 129, FIG. 5, with suitable shafts, as delineated hereinbefore. The body 129 may be formed of a resilient material, such as a hard rubber or it may be metallic, either tubular or solid.

The belt member 61 has a plurality of longitudinally disposed perforations, or apertures, 111, FIG. 3, for engaging a belt moving means. As illustrated, the apertures 111 are disposed on both edges of the belt to facilitate uniform advancement of both sides of the belt and prevent binding during movement of the belt for transferring the wastes into the waste catch pan 63.

The waste catch pan 63, FIG. 1, is disposed beneath the respective scraper means 65 to catch the wastes that are scraped from the belt 61. The scraper pan 63 may comprise any pan, metallic or plastic. As illustrated, it has an interior lip portion 113 disposed beneath the entry end 69 of the wash pan 57 for balance support. A longitudinally extending bar 114 provides support for the bottom of the waste pan 57. By this means, the waste pan may be removed by simple upward and outward motion to disengage from the support. It is installed by the converse motion. The lateral dimensions of the waste catch pan 63 are as small as feasible and still ensure catching of the wastes from the respective scraper means 65.

The scraper means 65, FIG. 4, comprise a blade portion 115 with a scraper edge 117 that engages the "top surface" of the belt member 61. By top surface is meant the surface that is on top in traversing beneath the cages. The scraper edge 117 thus scrapes wastes from the surface of the belt before the surface becomes inverted, or on the bottom, during the traversal backward over the next lower tier of cages. The blade 115 is biased by suitable biasing means, such as spring 119, such that its edge 117 engages the top surface of the belt 61. As illustrated, the spring 119 is disposed peripherally of a pivotal shaft 121 that is journalled in aperture 123 in the corner post 13. A first end 125 of the spring engages the blade 115 while a second end 127 engages the corner post 13 to maintain the blade biased into the proper position to scrape the belt when it is moved by the belt moving means 67.

The belt moving means 67 includes a roller 131, FIG. 6, that has a plurality of peripherally disposed stubs 133 that engage the apertures 111 for moving the belt 61. The roller 131 is mounted on a shaft 135 that is journalled in suitable means, such as bearings 137, for rotation responsive to torque. The torque may be supplied by a motor-gear combination. As illustrated, however, the torque is supplied manually via hand crank 139. Thus, the hand crank 139 and roller-stub combination serve as a sprocket for advancing the belt 61 when desired, as by rotation of the hand crank 139. The hand crank is mounted by suitable brackets 141 that are affixed, as by bolts or welding, to the frame 11 at any desired height.

In operation, the occupants of the cages are placed thereinto; for example, white mice may be emplaced in the respective cages 17. The laterally extending flanges 20 of the cages 17 are inserted into the runners 19 of the frame 11. Thereafter, the water bottles are emplaced on the cages with the drinking nozzles accessible to the occupant. At such time as it is necessary to change out or add water in the water bottles, the flexible conduit 53 and drinking nozzle 33 are held vertical and the lid 43 removed. The water may be merely added or the old water may be emptied and fresh water added. The water may be added or changed with the bottles 35 in situ if desired. On the other hand, the water bottles 35 may be lifted and pulled outwardly readily so as to disengage their respective supports 37 and 39 from the apertures 27 and 29, FIG. 2, or the grid structure at the end, FIG. 1. In any event, after the water is adjusted as desired, the lid 43 is pressed back into position and the excess water allowed to run out until equilibrium is established between vacuum interiorly of the bottle and the water at the nozzle 33. If the water bottle 35 has been removed, the supports 37 and 39 are inserted then into the apertures 27 and 29 and the drinking nozzle 33 is inserted into the aperture 31 interiorly of the cage 17 to reinstall the water bottle, with its equilibrium vacuum. Thus, water is dispensed on demand and not otherwise.

Generated wastes, such as droppings, urine and the like, fall through the perforate bottom 21 and onto belt 61. At least periodically, the belt 61 is advanced to cause it to traverse through the respective wash solution and disinfectant solution. The excess solutions are squegeed from the belt and run back into their respective pans. Thus, new, cleaned and disinfected runs of the belt 61 are positioned beneath the respective cages 17.

Other Embodiments;

The battery frame 11 may be wide enough for two rows of cages in each tier, since efficiency of space utilization is improved thereby. A typical level, or tier, divider 15 for such a battery is illustrated in FIG. 7. Therein are provided two rows 147 and 149 of perforations 18 for the respective rows of cages.

Economical cages are provided by a simple wire basket 151, FIGS. 8 and 9, having an invertible insert 153 therewithin. The insert 153 is solid, as of thermoplastic material, and has windows 155-157 adjacent respective edges for ventilation. In FIG. 8 the windows 155-157 are located at the bottom edge of the insert 153. In FIG. 9, the insert 153 has been inverted so the windows 155-157 are at the top edge. Thus, by alternate inversion of the standardized inserts 153, the cages may be placed adjacent each other without contact, physical or visible, between the occupants of adjacent cages. Yet, adequate ventilation is provided. Economy is effected by the single standard insert for a predetermined size cage. Also, the insert does not interfere with attachment of the water bottles 35.

Another embodiment of the water bottles 35 is illustrated in FIG. 10. Therein, a slidably mounted retainer, such as encircling band 159 adjustably holds the container 41. The band 159 has the top support 37. Since the band 159 and support 37 are slidable vertically of the container 41, attachment of the support 37 and, consequently, the water bottle 35 is made easy. The container 41 has a straight protrusion for bottom support 39 to make attachment of the water bottle 35 to the cage 17 even easier. The lid 43 and the top of the container 41 have the same structure described hereinbefore and illustrated in FIGS. 2 and 2A. The container also has the outlet 55 for attaching the flexible conduit 53 and drinking nozzle 33 as decribed hereinbefore.

The waste catch pans 63 may be slightly deeper so as to sit directly on the bottom divider; as do the other pans 57 and 59, FIG. 1; and obviate the requirement for bar 114. On the other hand, the waste catch pans 63 can be emplaced more closely adjacent their respective scraper means 65. For example, as illustrated in FIG. 11, each respective scraper means 65 has an L-shaped flange 161 forming a bottom U-structure for attaching directly thereto individual waste catch pans 63. Each waste pan 63 has a complementary L-shaped flange 163 that snaps into and out of flange 161 for ready installation and emptying.

While a wide variety of specific forms of the respective elements of apparatus have been described hereinbefore any other forms may be employed that will satisfy the demands delineated. For example, the belt moving means may comprise adjoining rollers frictionally contiguous the belt 61 for advancing the belt. Moreover, while only one powered roller has been shown for advancing the belt, any number of the respective idler rollers may be converted to powered rollers for advancing the belt to make the operation of the belt proceed more smoothly.

If desired, the belt may move continuously rather than intermittently. When moved continuously, it is operated at a slow speed. In any event, the same highly effective results are achieved.

Cleaning of the respective elements is made easy by the exposed structure delineated hereinbefore. When the respective pans 57 and 59 need to be cleaned, respective rollers 79-81 are readily snapped from their respective holder means, such as C-clamps 77.

From the foregoing, it can be seen that this invention provides the objects delineated hereinbefore.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A battery combination comprising:
   a. a support frame having a plurality of vertically disposed and aligned tiers;
   b. a plurality of cages, each having perforate floors to direct wastes by gravity exteriorly of said cages; said cages being arranged in a plurality of rows that are arranged in said plurality of tiers;
   c. a wash pan containing a surfactant solution;
   d. a disinfectant pan containing a solution of disinfectant;
   e. an endless belt member traversing forwardly beneath respective said tiers of cages for collecting said wastes and backwardly over the top of a next lower said tier to protect occupants thereof from said wastes; said belt member traversing through said surfactant solution in said wash pan and through said disinfectant solution in said disinfectant pan;
   f. a waste catch pan;
   g. a plurality of scraper means for scraping wastes from said belt member; said plurality of scraper means being disposed adjacent the bottom of each tier, contiguous said belt member, and above said waste pan such that waste will feed by gravity into said waste pan when scraped from said belt member by said scraper means; and
   h. belt member moving means for moving said belt member; said belt member moving means being connected with said frame and engaging said belt member for imparting motion thereto, at least periodically;
   whereby at least semi-automated cleaning of said cages becomes feasible without causing discomfort or a health hazard to the occupants thereof.

2. The combination of claim 1 wherein said belt member has a perforate top surface and an absorbent center for absorbing liquid wastes.

3. The combination of claim 2 wherein said belt member has a plurality of longitudinally disposed perforations at a predetermined spacing and said belt moving means has a roller with a plurality of stubs at said predetermined spacing for engaging said perforations and causing said belt member to move when said roller is rotated.

4. The combination of claim 3 wherein a plurality of first idler rollers are disposed at the respective downstream ends beneath the cages in respective tiers and adjacent said scraper means; and a plurality of second idler rollers are disposed at the respective upstream ends of respective tiers such that said belt member traversing between said rollers will traverse beneath the cages in that respective tier.

5. The combination of claim 4 wherein a plurality of return idler rollers are disposed at said upstream ends with at least a portion extending above said cages in said respective tiers such that said belt member traversing from said first idler roller to said return idler roller will traverse above said cages for protecting the occupants of said cages in said tiers.

6. The combination of claim 1 wherein each said cage has a plurality of apertures spaced apart in an accessible one of its four upwardly extending walls and a plurality of water bottles are provided; each said water bottle having a plurality of supports spaced apart and adapted to be slipped into said apertures in said cages and thereafter to retain said water bottle in position for dispensing drinking water on demand to said occupant of said cages; said water bottle comprising a container having at its first and top end a lid that seals vacuum tight when pressed into position, a tubular outlet adjacent its second and bottom end; said bottom end being sealingly connected with the walls for holding said water and vacuum; a flexible conduit connected with said outlet; a drinking nozzle of reduced diameter connected with said flexible conduit; said flexible conduit and said drinking nozzle extending laterally and adapted for insertion of a drinking end interiorly of said cage to afford drinking water to said occupant; said water bottle container, vacuum-tight lid, sealed bottom, flexible conduit and drinking nozzle coacting to dispense water on demand and not otherwise in normal operation and readily refillable by the simple expedient of snapping said top off and refilling said container with flow through said flexible conduit and drinking nozzle being prevented to keep water from running out of said container.

7. The combination of claim 6 wherein respective said supports of said water bottles are spaced apart vertically so as to define respective top supports and bottom supports for said water bottles; wherein each said top support is mounted on a retainer means and said retainer means slidably engages its said water bottle when inverted to facilitate attachment without the requirement of predetermined spacing of said supports and co-engaging apertures on said cage.

8. The combination of claim 1 wherein said support frame includes respective perforate level dividers at each said tier for increased ventilation therethrough.

9. The combination of claim 1 wherein said cages comprise respective baskets having bottom and walls of open grid structures and invertible inserts disposed peripherally therewithin; said inserts being solid and opaque and having a plurality of windows at a predetermined edge, alternate said inserts being inverted such that said windows do not align and said occupants of said cages are denied visible contact with adjacent cage occupants.

10. A rodent cage and water bottle combination comprising:
    a. a rodent cage having a perforate bottom to allow wastes to be dropped by gravity exteriorly of said cage; having a continuous periphery of walls extending upwardly from said bottom, at least one of said upwardly extending walls affording a view of the interior of said cage, at least one of said upwardly extending walls adapted at the top thereof to engage a member to form a lid, at least one of four upwardly extending walls that is accessible when said cage is installed in a battery having a plurality of spaced apart apertures penetrating therethrough for supporting a water bottle and having at least one other aperture for insertion of a drinking nozzle; said cage comprising a basket having bottom and walls of open grid structure and an invertible insert disposed peripherally therewithin, said insert being solid and opaque along a plurality of said walls and having a plurality of windows at a predetermined edge; and
    b. a drinking bottle attached to said rodent cage; said drinking bottle having a plurality of supports spaced apart and adapted to be slipped into said apertures in said cage and thereafter to retain said water bottle in position for dispensing drinking water on demand to said occupant of said cage; said supports of said water bottle being spaced apart vertically so as to define a top support and a bottom support therefor; said top support of said water bottle being mounted on a retainer means and said retainer means slidably engaging said water bottle when said water bottle is inverted to facilitate attachment of said water bottle to said cage without the requirement of predetermined spacing of said supports and said co-engaging apertures on said cage; said water bottle comprising a container having at its first and top end a readily removable lid that can be snapped open with one hand and that seals vacuum tight when pressed into position, a tubular outlet adjacent its second and bottom end; said bottom end being sealingly connected with the walls for holding said water and vacuum; a flexible conduit connected with said outlet; a drinking nozzle of reduced diameter connected with said flexible conduit; said drinking nozzle comprising an elongate inner bore having a diameter less than 5 millimeters and sufficiently small to prevent leaking of water when said vacuum tight lid is sealingly snapped into place and holds a vacuum on said water, and no demand for water is being made by the occupant of said cage; said flexible conduit and said drinking nozzle extending laterally and adapted for insertion of a drinking end interiorly of said cage to afford drinking water to said occupant; said water bottle container, vacuum-tight lid, sealed bottom, flexible conduit and drinking nozzle coacting to dispense water on demand and not otherwise in normal operation and readily refillable by the simple expedient of snapping said top off and refilling said container with flow through said flexible conduit and drinking nozzle being prevented during filling to prevent water running from said container.

11. A cage for rodents and the like comprising:
a. a lid means;
b. a basket having a grid structure for floors and upstanding walls; said upstanding walls having means at the top for engaging said lid means; said grid structure of one of said walls having spaced apart apertures penetrating therethrough and adapted, respectively, for engaging water bottle supports and for insertion of a drinking nozzle; and
c. a solid opaque insert disposed peripherally interiorly of at least three of said walls of said cage; said insert being solid and opaque and having a plurality of windows adjacent to a predetermined edge; said insert being invertible such that alternate cages in an array of cages may have said inserts inverted to prevent visible contact between occupants of said adjacent cages.

12. The rodent cage of claim 11 wherein a drinking bottle is attached thereto; said drinking bottle having a plurality of supports spaced apart and adapted to be slipped into said apertures in said basket for retaining said water bottle in place in said cage and, thereafter, retain said water bottle in position for dispensing drinking water on demand to said occupant of said cage; said top support of said water bottle being mounted on a retainer means and said retainer means slidably engages said water bottle when inverted to facilitate attachment of said water bottle to said cage without the requirement of predetermined spacing of said supports and said coengaging apertures on said cage; said water bottle comprising a container having at its first and top end a lid that seals vacuum tight when pressed into position, a tubular outlet adjacent its second and bottom end; said bottom end being sealingly connected with said walls for holding said water and vacuum; a flexible conduit connected with said outlet; a drinking nozzle having a drinking end of reduced diameter; said drinking nozzle being connected with said flexible conduit; said flexible conduit and said drinking nozzle extending laterally and adapted for insertion of a drinking end interiorly of said cage to afford drinking water to said occupant; said water bottle container, vacuum-tight lid, sealed bottom, flexible conduit and drinking nozzle co-acting to dispense water on demand and not otherwise in normal operation and being readily refillable by the simple expediate of snapping off said top and refilling said container with flow through said flexible conduit and drinking nozzle being prevented.

13. The cage of claim 11 wherein there is included:
a. a support frame for supporting said cage;
b. a wash pan containing a detergent solution;
c. a disinfectant pan containing a disinfectant solution;
d. an endless belt traversing forwardly beneath said cage and through said detergent solution in said wash pan and through said disinfectant solution in said disinfectant pan;
e. a scraper means for scraping wastes from said belt member; said scraper means being disposed adjacent to the bottom of said cage, contiguous said belt member for scraping wastes therefrom before said belt traverses through said wash pan and disinfectant pan;
f. waste catch pan disposed below said scraper means for receiving said wastes; and
g. belt moving means for moving said belt member; said belt moving means being connected with said support frame and engaging said belt member for imparting motion thereto, at least periodically; whereby at least semi-automated cleaning of said cage becomes feasible without causing discomfort or health hazard to its occupant.

* * * * *